US008924718B2

(12) United States Patent
Janakiraman et al.

(10) Patent No.: US 8,924,718 B2
(45) Date of Patent: Dec. 30, 2014

(54) DECIPHERING INTERNET PROTOCOL (IP) SECURITY IN AN IP MULTIMEDIA SUBSYSTEM (IMS) USING A MONITORING SYSTEM

(71) Applicant: Tektronix, Inc., Beaverton, OR (US)

(72) Inventors: Vignesh Janakiraman, Plano, TX (US); John P. Curtin, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 191 days.

(21) Appl. No.: 13/663,391

(22) Filed: Oct. 29, 2012

(65) Prior Publication Data

US 2014/0122874 A1    May 1, 2014

(51) Int. Cl.
*H04L 29/06*    (2006.01)
*H04W 12/00*    (2009.01)

(52) U.S. Cl.
CPC ..................................... *H04W 12/00* (2013.01)
USPC ........................................................... 713/160

(58) Field of Classification Search
None
See application file for complete search history.

(56) References Cited

U.S. PATENT DOCUMENTS

| | | | |
|---|---|---|---|
| 2004/0085949 A1* | 5/2004 | Partanen et al. | 370/352 |
| 2008/0019525 A1* | 1/2008 | Kruegel et al. | 380/273 |

* cited by examiner

*Primary Examiner* — Samson Lemma
*Assistant Examiner* — Malcolm Cribbs
(74) *Attorney, Agent, or Firm* — Edwards Wildman Palmer LLP; Scott D. Wofsy; George N. Chaclas (57) ABSTRACT

Systems and methods for deciphering Internet Protocol (IP) security in an IP Multimedia Subsystem (IMS) using a monitoring system are described. In some embodiments, a method may include identifying a Security Association (SA) between a User Equipment (UE) and a Proxy Call Session Control Function (P-CSCF) of an Internet Protocol (IP) Multimedia Subsystem (IMS) over a Gm interface during a registration procedure, correlating the SA with a ciphering key (CK) exchanged between the P-CSCF and a Serving CSCF (S-CSCF) of the IMS over an Mw interface during the registration procedure, and storing an indication of the correlated SA and CK in a deciphering record.

17 Claims, 5 Drawing Sheets

DECIPHERING INTERNET PROTOCOL (IP) SECURITY IN AN IP MULTIMEDIA SUBSYSTEM (IMS) USING A MONITORING SYSTEM

BACKGROUND

The Internet Protocol (IP) Multimedia Subsystem (IMS) is a network architecture that enables telecommunication network operators to provide certain services to its subscribers. For instance, IMS implements Voice-over-IP (VoIP) services based upon the Session Initiation Protocol (SIP). More generally, IMS allows a network operator to provide a number of other multimedia services, including, for example, Internet access. In the IMS core, however, services are not provided until a secure (e.g., encrypted or cyphered) connection is established.

In order to remain competitive, network operators employ network-monitoring systems configured to analyze their services, performance, customer experience, equipment issues, etc. As the inventors hereof have recognized, however, existing telecommunication network monitoring systems are not capable of deciphering secure communications taking place through an IMS. To address these, and other issues, the inventors hereof have developed various systems and method for deciphering those communications.

SUMMARY

Embodiments of systems and methods for deciphering Internet Protocol (IP) security in an IP Multimedia Subsystem (IMS) using a monitoring system are described herein. In an illustrative, non-limiting embodiment, a method may include identifying a Security Association (SA) between a User Equipment (UE) and a Proxy Call Session Control Function (P-CSCF) of an Internet Protocol (IP) Multimedia Subsystem (IMS) over a Gm interface during a registration procedure, correlating the SA with a ciphering key (CK) exchanged between the P-CSCF and a Serving CSCF (S-CSCF) of the IMS over an Mw interface during the registration procedure, and storing an indication of the correlated SA and CK in a deciphering record.

In some implementations, the SA may include a security parameter index (SPI) and a destination IP address. Also, identifying the SA may include identifying a first SA pair and a second SA pair, where the first SA pair may include: (a) a UE client SPI value and UE IP address and (b) a UE server SPI value and UE IP address, and where the second SA pair may include (a) a P-CSCF client SPI value and P-CSCF IP address and (b) a P-CSCF server SPI value and P-CSCF IP address. Furthermore, correlating the SA with the CK may include matching a user identity from a message exchanged between the UE and the P-CSCF during the registration procedure against another message exchanged between the P-CSCF and the S-CSCF during the registration procedure. In some cases, the user identity may be an IP Multimedia Private Identity (IMPI) value.

In some embodiments, the method may also include storing, in the deciphering record, an indication of a security algorithm type to be used in subsequent communications between the UE and the IMS. After the registration procedure, the method may include receiving a ciphered packet exchanged between the UE and the P-CSCF over the Gm interface, ascertaining an SA associated with the ciphered packet, identifying a CK corresponding to the ascertained SA in the deciphering record, and deciphering the ciphered packet, at least in part, using the identified CK. For example ascertaining the SA may ascertaining at least one of: (a) a UE client SPI value and UE IP address, (b) a UE server SPI value and UE IP address, (c) a P-CSCF client SPI value and P-CSCF IP address, and (d) a P-CSCF server SPI value and P-CSCF IP address.

In some implementations, the ciphered packet may follow an Encapsulating Security Payload (ESP) protocol. Additionally or alternatively, the ciphered packet may be transmitted in Transport Mode.

In another illustrative, non-limiting embodiment, a method may include identifying a Security Association (SA) between a User Equipment (UE) and a Proxy Call Session Control Function (P-CSCF) of an Internet Protocol (IP) Multimedia Subsystem (IMS) over a Gm interface during an authentication procedure, correlating the SA with a ciphering key (CK) exchanged between the P-CSCF and a Serving CSCF (S-CSCF) of the IMS over an Mw interface during the authentication procedure, storing an indication of the correlated SA and CK in a deciphering record, receiving a ciphered packet exchanged between the UE and the P-CSCF after the authentication procedure, the ciphered packet following an Encapsulating Security Payload (ESP) protocol in Transport Mode, ascertaining an SA associated with the ciphered packet, identifying a CK corresponding to the ascertained SA in the deciphering record, and deciphering the ciphered packet, at least in part, using the identified CK.

In some embodiments, one or more of the techniques described herein may be performed by one or more telecommunication network monitoring systems. In other embodiments, a tangible and/or non-transitory computer-readable storage medium may have program instructions stored thereon that, upon execution by one or more computer systems, cause the one or more computer systems to perform one or more operations disclosed herein. In yet other embodiments, a telecommunication network monitoring system may include at least one processor and a memory coupled to the at least one processor, the memory configured to store program instructions executable by the at least one processor to cause the telecommunication network monitoring system to perform one or more operations disclosed herein.

BRIEF DESCRIPTION OF THE DRAWINGS

Reference will now be made to the accompanying drawings, where.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
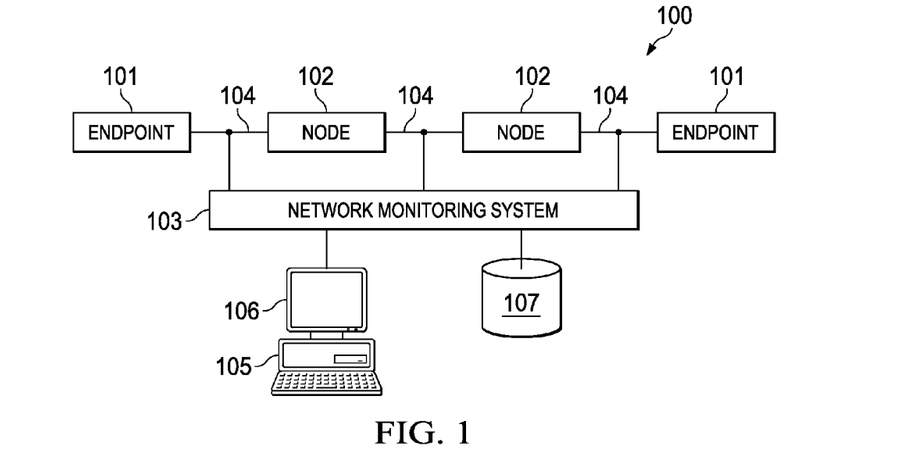
FIG. 1 is a block diagram of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution/Service Architecture Evolution (LTE/SAE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a LTE/SAE network or any other core network nodes or routers that transfer data packets or messages between endpoints 101. Examples of these, and other elements, are discussed in more detail below with respect to FIG. 4.

Still referring to FIG. 1, many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). It will be understood that packets exchanged between devices 101 may conform to numerous other protocols now known or later developed.

Network monitoring system 103 may be used to monitor the performance of network 100. Particularly, monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density LOGE probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward LOGE and beyond (e.g., 100GE), each link 104 may support more users' flows and sessions. Thus, in some embodiments, link 104 may be a LOGE or a collection of LOGE links (e.g., one or more 100GE links) supporting thousands or tens of thousands of users or subscribers. Many of the subscribers may have multiple active sessions, which may result in an astronomical number of active flows on link 104 at any time where each flow includes many packets.

Figure 2:
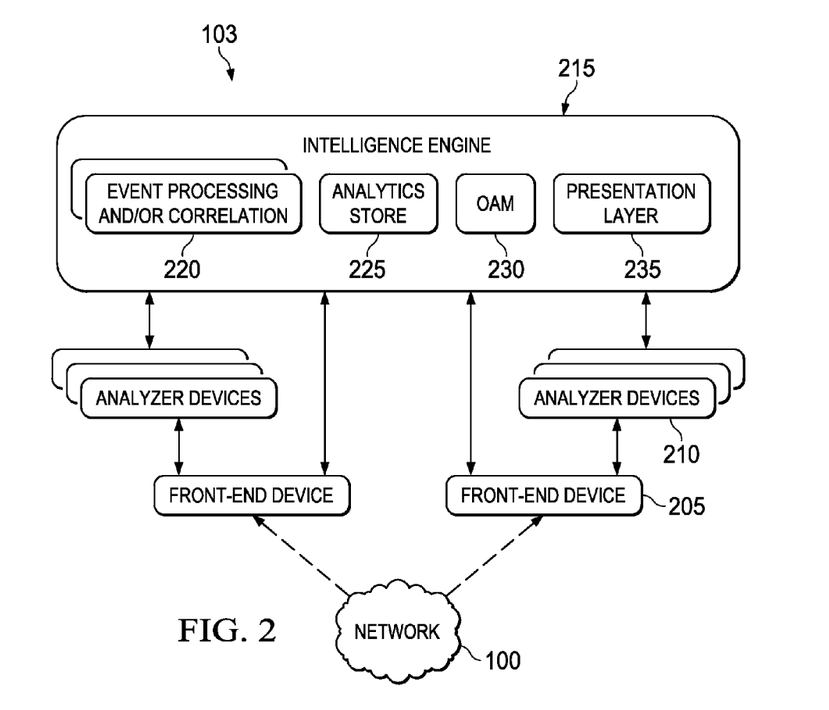
FIG. 2 is a block diagram of a hierarchical network monitoring system according to some embodiments.

Turning to FIG. 2, an example of network monitoring system 103 is illustrated according to some embodiments. As shown, one or more front-end monitoring devices or probes 205 (i.e., a first tier of a three-tiered architecture) may be coupled to network 100. Each of front-end devices 205 may also be coupled to one or more network analyzer devices 210 (i.e., a second tier), which in turn may be coupled to intelligence engine 215 (i.e., a third tier). Front-end devices 205 may also be directly coupled to intelligence engine 215, as described in more detail below. Typically, front-end devices 205 may be capable or configured to process data at rates that are higher (e.g., about 10 or 100 times) than analyzers 210. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.).

Generally speaking, front-end devices 205 may passively tap into network 100 and monitor all or substantially of its data. For example, such one or more of front-end devices 205 may be coupled to one or more links 104 of network 100 shown in FIG. 1. Meanwhile, analyzer devices 210 may receive and analyze a subset of the traffic that is of interest, as defined by one or more rules. Intelligence engine 215 may include a plurality of distributed components configured to perform further analysis and presentation of data to users. For example, intelligence engine may include Event Processing and/or Correlation (EPC) 220; analytics store 225; Operation, Administration, and Maintenance (OAM) module 230; and presentation layer 235.

In some embodiments, front-end devices 205 may be configured to monitor all of the network traffic that it is tapped into (e.g., 10GE, 100GE, etc.). Front-end devices 205 may also be configured to intelligently distribute traffic based on a user session level. Additionally or alternatively, front-end devices 205 may distribute traffic based on a transport layer level. In some cases, each device 205 may analyze traffic intelligently to distinguish high-value traffic from low-value traffic based on a set of heuristics. Therefore, in some implementations, front-end devices 205 may feed higher-valued traffic to a more sophisticated one of analyzers 210 and lower-valued traffic to a less sophisticated one of analyzers 210 (to provide at least some rudimentary information).

Front-end devices 205 may also be configured to aggregate data to enable backhauling, to generate netflows and basic KPI calculations, time stamping of data, port stamping of data, filtering out unwanted data, protocol classification, and deep packet inspection (DPI) analysis. In addition, front-end devices 205 may be configured to distribute data to the back-end monitoring tools (e.g., analyzers 210 and/or intelligence engine 215) in a variety of ways, which may include flow based or user session based balancing. Devices 205 may also receive dynamic load information (e.g., namely CPU and memory utilization) from each of analyzer devices 210 so to enable intelligent distribution of data.

Analyzer devices 210 may be configured to passively monitor a subset of the traffic that has been forwarded to it by the front-end device(s) 205. Analyzer devices 210 may also be configured to perform stateful analysis of data, extraction of key parameters for call correlation and generation of call data records (CDRs), application specific processing, computation of application specific KPIs, and communication with intelligence engine 215 for retrieval of KPIs (e.g., in real-time and/or historical mode). In addition, analyzer devices 210 may be configured to notify front-end device(s) 205 regarding its CPU and/or memory utilization so that front-end device(s) 205 can utilize this information to intelligently distribute traffic.

Intelligence engine 215 may follow a distributed and scalable architecture. In some embodiments, EPC module 220 may receive events and may correlate information from front-end and analyzer devices 205 and 210, respectively. OAM module 230 may be used to configure and/or control front-end device 205 and analyzer devices 210, distribute software or firmware upgrades, etc. Presentation layer 235 may be configured to present event and other relevant information to the end-users. Analytics store 225 may include a storage or database for the storage of analytics data or the like.

In some implementations, analyzer devices 210 and/or intelligence engine 215 may be hosted at an offsite location (i.e., at a different physical location remote from front-end devices 205). Additionally or alternatively, analyzer devices 210 and/or intelligence engine 215 may be hosted in a cloud environment.

Figure 3:
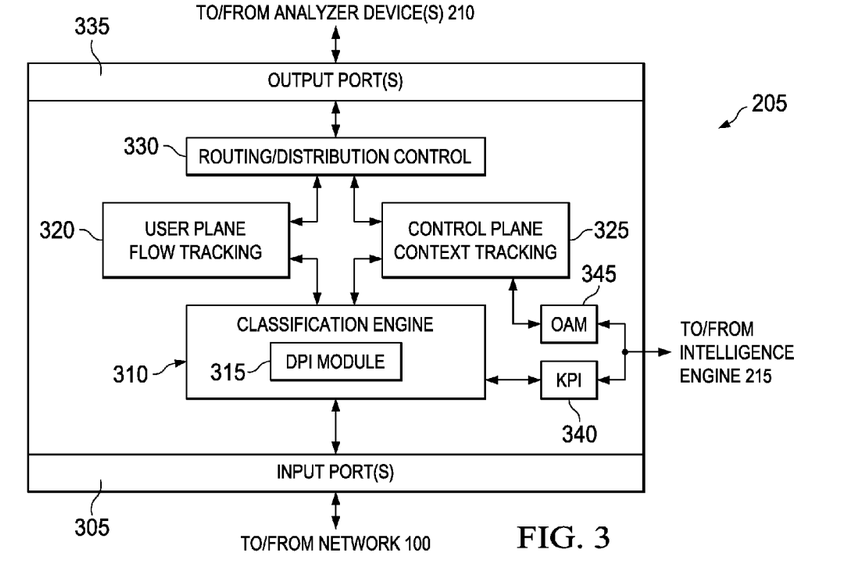
FIG. 3 is a block diagram of a monitoring probe according to some embodiments.

FIG. 3 is a block diagram of an example of front-end monitoring probe 205 according to some embodiments. Input port(s) 305 (e.g., 8, 40, or 100 Gb/s) may be coupled to network 100 and to classification engine 310, which may include DPI module 315. Classification engine 310 may be coupled to user plane (UP) flow tracking module 320 and to control plane (CP) context tracking module 325, which may be coupled to routing/distribution control engine 330. Routing engine 330 may be coupled to output port(s), which in turn may be coupled to one or more analyzer devices 210. In some embodiments, KPI module 340 and OAM module 345 may also be coupled to classification engine 310 and/or tracking modules 320/325, as well as to intelligence engine 215.

In some implementations, front-end probe or device 205 may be configured to receive traffic from network 100, for example, at a given data rate (e.g., 10 Gb/s, 100 Gb/s, etc.), and to transmit selected portions of that traffic to one or more analyzers 210, for example, at a different data rate. Classification engine 310 may identify user sessions, types of content, transport protocols, etc. (e.g., using DPI module 315) and transfer UP packets to flow tracking module 320 and CP packets to context tracking module 325. In some cases, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

OAM module 345 of front-end device 205 may be coupled to OAM module 230 of intelligence engine 215 and may receive control and administration commands, such as, for example, rules that allow classification engine 310 to identify particular types of traffic. For example, based on these rules, classification engine 310 may be configured to identify and/or parse traffic by user session (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a same connection are routed to the same one of analyzers 210.

In various embodiments, blocks 305-345 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

In various embodiments, the systems depicted in FIGS. 1-3 above may be employed to facilitate the deciphering of secure communications taking place through an Internet Protocol (IP) Multimedia Subsystem (IMS) portion of a telecommunications network.

Figure 4:
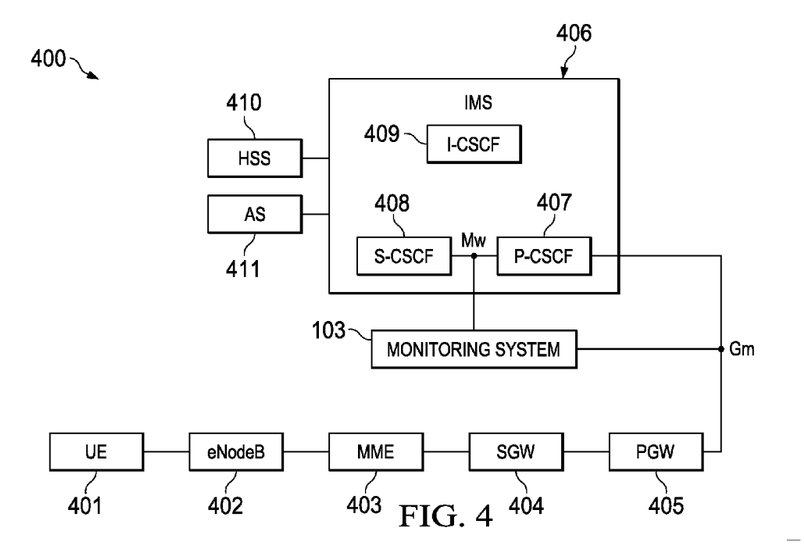
FIG. 4 is a block diagram of a network monitoring system deployed in connection with an Internet Protocol (IP) Multimedia Subsystem (IMS) core of a System Architecture Evolution (SAE) network, according to some embodiments.

In that regard, FIG. 4 is a block diagram of network monitoring system 103 deployed in connection with IMS core 406 of an example of a System Architecture Evolution (SAE) network 400, to illustrate an implementation of various techniques described herein according to some embodiments. As shown, User Equipment (UE) 401 is coupled to Evolved Node B (eNodeB) 402, eNodeB 402 is coupled to Mobility Management Entity (MME) 403, MME 403 is coupled to Serving Gateway (SGW) 404, and SGW 404 is coupled to Packet Data Network (PDN) Gateway (PGW) 405, which in turn is coupled to IMS core 406. Particularly, PGW 405 is coupled to Proxy Call Session Control Function (P-CSCF) node 407 over a Gm interface. P-CSCS is coupled to Servicing CSCF (S-CFCS) node 408 via an Mw interface, and IMS core 406 also includes Interrogating CSCF (I-CSCF) node 408. IMS core 406 is coupled to Home Subscriber Server (HSS) 410 and to Application Server(s) (AS) 410.

In operation, UE 401 may access SAE network 400 through eNodeB 402 over an air interface. MME 403 may provide, for example, tracking, paging, bearer activation, and deactivation processes. SGW 404 may be configured to route and forward user data packets, while also acting as mobility anchor during handovers. Meanwhile, PGW 405 may provide connectivity from UE 401 to external packet data networks (e.g., IMS 406) by being the point of exit and entry of traffic for UE 401. Also, HSS 410 may include a database with user and subscription-related information to enable mobility management, call and session establishment support, user authentication, access authorization, etc.

Generally speaking, IMS core 406 may provide an architectural framework for delivering IP multimedia services (e.g., as provided by AS 411) to UE 401, and it may typically employ Internet-standard protocol(s) such as, for example, Session Initiation Protocol (SIP) or the like. Furthermore, in IMS core 406, these service(s) are not provided until a secure connection is established between UE 401 and P-CSCF 407. In other words, in some embodiments, the Gm interface (i.e., the logical interface between PGW 405 and P-CSCF 407 which carries SIP traffic) is subject to IP Security (IPsec).

IPSec is an end-to-end security scheme operating at the Internet Layer of the IP Suite, and it includes two core security protocols: (i) Authentication Header, which provides authentication only and no confidentiality protection (encryption); and (ii) Encapsulating Security Payload (ESP), which provides confidentiality protection, authentication and connectionless integrity. In addition to these two protocols, IPSec provides two modes of operations: (i) Transport Mode, where only the payload of the IP packet is encrypted and/or authenticated (routing is intact since the IP header is not modified or encrypted; thus making it suitable for host-to-host communications); and (ii) Tunnel Mode, where the entire IP packet is encrypted and/or authenticated and it is then encapsulated in a new IP packet with a new IP header (typically used for network-network communications and support traversal of Network Address Translation (NAT) gateways).

In some embodiments, the systems and methods described herein may provide techniques that enable real-time deciphering of IPSec Payload using ESP in Transport Mode, for example, by deploying network monitoring system 103 as shown in FIG. 4—i.e., with probes tapping into traffic exchanged across the Gm and Mw interfaces. The key exchange scheme used for IPSec on the Gm interface is known as IMS Authentication and Key agreement (IMS AKA). Typically, the particular IMS AKA scheme for authenticating a subscriber or UE 401 is chosen by the S-CSCF 408 and HSS 410 nodes. The security parameters (e.g., keys) generated by the selected IMS AKA scheme are then transported by SIP.

The IMS AKA achieves mutual authentication between UE 401 and S-CSCF 408. Using the selected IMS AKA, HSS 410 generates a set of authentication vectors (AV) and sends them to S-CSCF 408. Each AV may include, for example, Random Number (RAND), Expected Response (XRES), Ciphering Key (CK), Integrity Key (IK), and Authentication Token (AUTN) values. Particularly, RAND may be a random number sent to UE 401 for generating XRES, CK and IK, XRES may be an expected response which is compared with an actual response in order to allow the IMS AKA procedure to be successful, CK may be a cypher key having a number of symbols that control the enciphering and deciphering between UE 401 and P-CSCF 407, IK may be a data protection key used for protecting the integrity of data items as well as verifying the origin of a message (it is sometimes generated together with CK in a setup procedure), and AUTN may be used to authenticate a sender, among other things.

S-CSCF 408 may then select one of these vectors and exchange it with the P-CSCF 407 over the Mw interface for authentication with UE 401. In some embodiments, the IP Multimedia Private Identity (IMPI) is the identity used in the SIP messages of both the Mw and Gm interfaces that is used to correlate CK/IK with Security Associations (SAs) setup on Gm Interface. Particularly, an SA is setup between UE 401 and P-CSCF 407 to decide what security algorithms to apply and when the security service shall start. There are two pairs of SA between UE 401 and P-CSCF 407, one SA pair serving for UE 401 operating as client to P-CSCF 407 operating as server, and the other SA pair serving for UE 401 operating as server to P-CSCF 407 operating as client. Each SA pair has two Security Parameter Index (SPI) values, one for each direction. An SPI is an identification tag included in the header of a packet when using IPsec for tunneling the IP traffic, and which enables a receiving node to select the SA under which a received packet will be processed (and also to discern between two traffic streams, for example, where different encryption rules and algorithms may be in use). Thus there are a total of 4 SPI values, between UE 401 and P-CSCF 407. Only two pairs of SAs are active between UE 401 and P-CSCF 407, and these two pairs of SAs may be updated when a new successful authentication of the subscriber has occurred.

Figure 5:
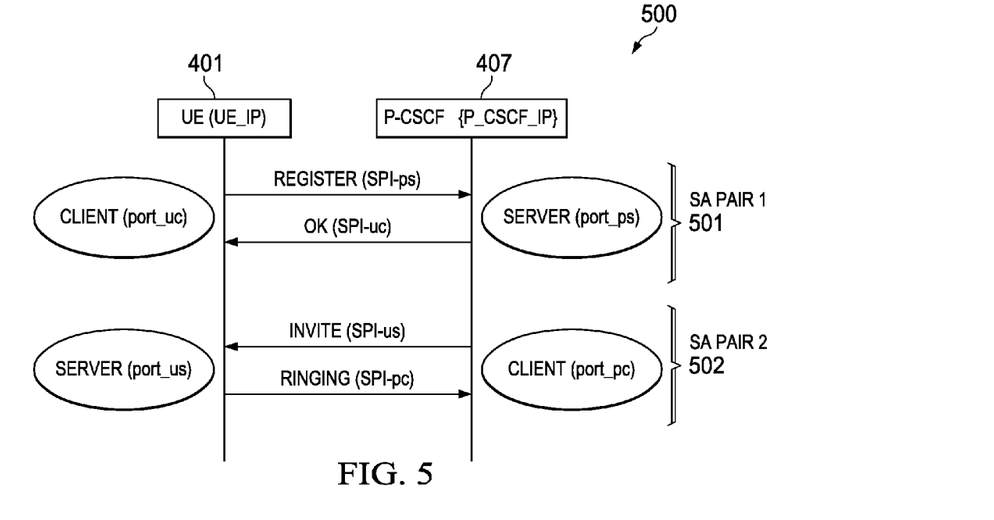
FIG. 5 is a call flow diagram illustrating Security Associations according to some embodiments.

To illustrate the foregoing, FIG. 5 shows call flow diagram 500 illustrating an example of a call flow using protected signaling where each side is acting as a client/server and showing four different SPI values and the ports to which they are associated with. None of the signaling here is unprotected, and they are all sent on one of the SA pairs on the Gm interface between UE 401 and P-CSCF 407 according to some embodiments. Particularly, SIP messages 501 include a registration and response message between UE 401 (acting as a client node) and P-CSCF 407 (acting a server node), on a first SA pair (SPI-ps and SPI-uc, respectively). Then, SIP messages 502 include an invitation and a ringing message between P-CSCF 407 (acting as a client node) and UE 401 (acting a server node), on a second SA pair (SPI-us and SPI-pc, respectively). It should be noted that, with respect to the first SA pair, the source and destination IP addresses associated with this SA are identical to those in the header of the IP packet in which P-CSCF 407 receives the initial SIP register message. Also, in the second SA pair, the source and destination IP address are reversed compared to that of the first SA pair.

Again, each SA pair has two SPI values associated with it, one for the inbound direction and another for the outbound direction. Further, the triplet: SPI, destination IP address, and security protocol (i.e., ESP in this case) may uniquely identify an SA at the IP layer. In some embodiments, monitoring system 103 may be configured to map UE 401's IP address and its pair of SPI values (client and server) along with P_CSCF 407's IP address and its pair of SPI values (client and server) exchanged over the Gm interface with CK/IK values that are present on the Mw interface. Such a correlation may be performed, for example, using IMPI values, which are unprotected (in transport mode) and are shared on both the Mw and Gm Interfaces.

Figure 6:
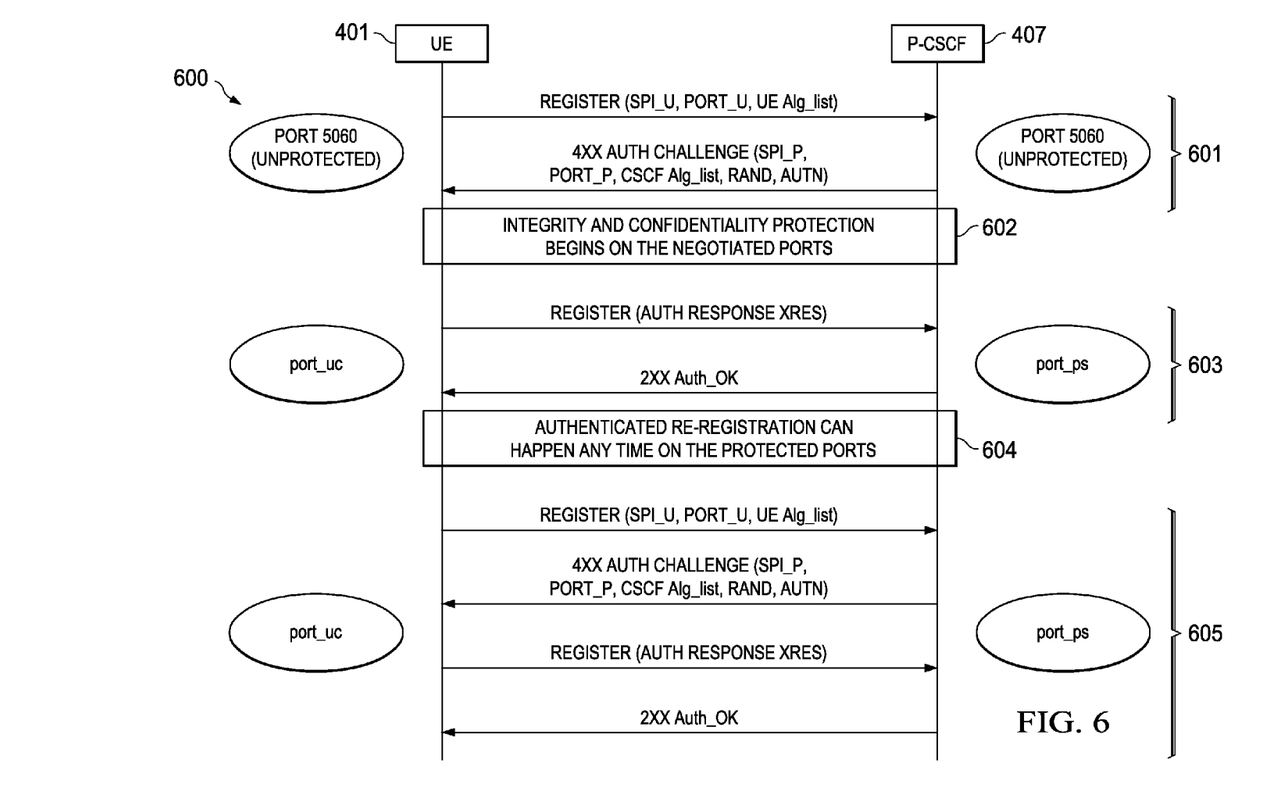
FIG. 6 is another call flow diagram illustrating an initial registration and authenticated re-registration procedure(s) according to some embodiments.

In the call flow of FIG. 6, 601 depicts the sequence of signaling events that is unprotected and seen on a known port (e.g port 5060). These messages also contain one pair of SPI values of UE 401 and the pair of protected ports to which subsequent signaling is sent to and from the UE 401. It also contains one pair of SPI values of P-CSCF 407 and the pair of protected ports to which subsequent signaling is sent to and from the P-CSCF 407. These messages may further contain the ciphering algorithm list that the UE 401 supports. The RAND/AUTN values may also be sent in the reply so that the XRES value generated by UE 401 may be verified and authenticated by P-CSCF 407.

In some embodiments, monitoring system 103 may build a table with the following lookups: (i) UE_IP+SPI_uc; (ii) UE_IP+SPI_us; (iii) P_CSCF_IP+SPI_pc; and (iv) P_CSCF_IP+SPI_ps. These keys may then be used to lookup a deciphering record which maintains the CK/IK values, the algorithm type being used, and the IMPI. Subsequent secure IPSec packets may contain the SPI value in the ESP layer and, along with the IP address in the IP layer, may be used to map back to the deciphering record, which includes information that may be used to perform the deciphering.

In short, to perform IPSec deciphering, for example, at the end of a registration or authentication procedure, monitoring system 103 may have obtained all 4 SAs (from the Gm interface) and correlated or corresponding CK/IK (from the Mw interface) using an IMPI value common to those messages. In some embodiments, upon collecting this information, monitoring system 103 may create a ciphering record or database. Such a database may be indexed, for example, by combination of SPI and destination IP address values. Moreover, each entry in the ciphering record may include CK/IK values, an indication of the ciphering algorithm used, and the IMPI. Accordingly, after the registration procedure is complete and a new database entry created, when monitoring system 103 detects a secure packet or message (e.g., over the Gm interface), monitoring system 103 may identify the SPI and destination IP address used in the header of that message, look up its corresponding ciphering information in the ciphering database, and use that information to decode the message.

Subsequent registration(s) are typically subject to encryption and are sent on the negotiated protected ports. To illustrate this, FIG. 6 shows another call flow diagram 600 depicting an initial unprotected registration and a subsequent authenticated re-registration procedure on Gm interface between UE 401 and P-CSCF 407 according to some embodiments. Particularly, diagram 600 shows SIP messages 601 depicts the sequence of signaling events that is unprotected and seen on a known port (e.g port 5060). Block 602 illustrates the point after integrity and confidentiality protection begins on the negotiated ports. Then, SIP messages 603 are exchanged, which are sent on the protected ports and ciphered. After 601 and 603 are complete, the initial registration may be deemed complete and successful. Such an authenticated re-registration procedure 604 may take lace any time on protected ports, and may repeat thereafter with SIP messages 605.

Here it should be noted that a periodic re-registration does not necessarily trigger a re-authentication. UE 401 may be involved in only one registration procedure at a time—i.e., UE 401 may remove any data relating to any previous incomplete registrations or authentications, including any SAs created by an incomplete authentication. Nonetheless, registrations that include a user authentication attempt typically produce new SAs. If the authentication is successful, then these new SAs may replace the previous ones. If UE 401 has an already active pair of SAs, then it may use this to protect the "register" message. However, UE 401 may send unprotected "register" messages at any time.

When monitoring system 103 is deployed in the middle (i.e., between IMS 106 and PGW 105, it can pose a challenge when the registration message is not seen in the clear i.e., unprotected or un-ciphered. Probes are generally not able to decipher the IPSec payload from UE 401 unless it monitors a single registration message from UE 401 in the clear. Once the clear registration is seen, the IMPI may be mapped to the decipher record with the CK/IK and algorithm type (or alternatively could be mapped to the IP Addresses of the SA pairs UE_IP and PCSCF_IP). In an error scenario where an initial registration message is seen in the clear and mapped, but the subsequent security protected registration or re-Authentication message fails to decipher, however, it is still possible to update the IMS decipher record with new CK/IK values using the IMPI lookup. And, if it is assumed that the IP address pairs and algorithm type did not change, the subsequently acquired ciphered messages may still be successfully deciphered using the new key.

In some embodiments, because the in-clear registration message may be sent by UE 401 during power-up, monitoring system 103 may employ a technique whereby deciphering records and lookup keys are persisted to disk as a fault tolerant recovery.

In some embodiments, the lifetime of the new SA may either equal the latest lifetime of the old SAs or it may expire shortly after a registration timer in the message, depending upon which gives the SAs the longer life. Thus, P-CSCF 407 may delete any SA whose lifetime is exceeded. Also UE 401 and/or P-CSCF 407 may delete all SAs it holds that are associated with a particular IMPI once all associated IP Multimedia Public Identities (IMPUs) are de-registered. In sum, SAs may be deleted when the lifetime is exceeded or when all IMPUs associated with an IMPI are de-registered. Moreover, when UE 401 changes its IP address, the UE may delete the existing SAs and initiate an unprotected registration procedure using the new IP address as the source IP address in the packets carrying the "register" messages.

Figure 7:
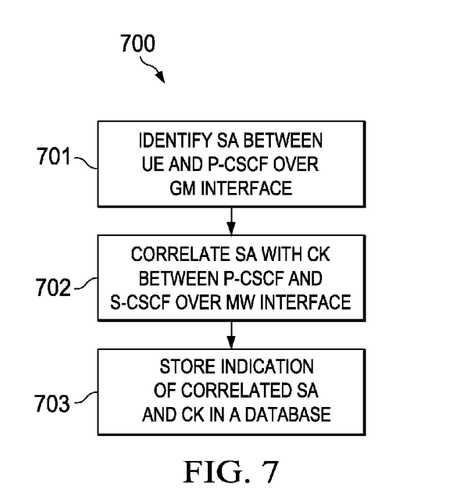
FIG. 7 is a flowchart of a method for creating a deciphering record according to some embodiments.
Figure 8:
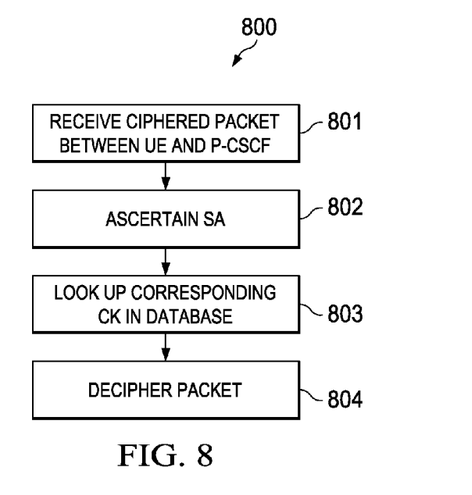
FIG. 8 is a flowchart of a method for deciphering a secure packet using a deciphering record or database according to some embodiments.

FIG. 7 is a flowchart of an example of a method for creating a deciphering record. In various embodiments, method 700 may be performed, at least in part, by monitoring system 103 coupled to network 400 as shown in FIG. 4, for example, in connection with an initial registration and/or authentication procedure between a UE and a P-CSCF. As illustrated, at block 701, method 700 may include identifying an SA between the UE and a P-CSCF of an IMS over a Gm interface. At block 702, method 700 may include correlating the SA with a CK exchanged between the P-CSCF and an S-CSCF of the IMS over an Mw interface (e.g., using an identifier value such as IMPI). Then, at block 703, method 700 may include storing an indication of the correlated SA and CK in a deciphering record or database FIG. 8 is a flowchart of an example of a method for deciphering a secure packet using a deciphering record or database according to some embodiments. Again, in various embodiments, method 800 may be performed, at least in part, by monitoring system 103 coupled to network 400 as shown in FIG. 4. In contrast with method 700, however, here method 800 may be performed in order to decipher one or more packets or messages, for example, after the initial registration and/or authentication procedure between the UE and the P-CSCF. As illustrated, at block 801, method 800 may include receiving a ciphered packet exchanged between the UE and the P-CSCF over the Gm interface. At block 802, method 800 may include ascertaining an SA associated with the ciphered packet. At block 803, method 800 may include identifying a CK corresponding to the ascertained SA in the deciphering record. Then, at block 804, method 800 may include deciphering the ciphered packet, at least in part, using the identified CK.

It should be understood that the various operations described herein may be implemented in software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Figure 9:
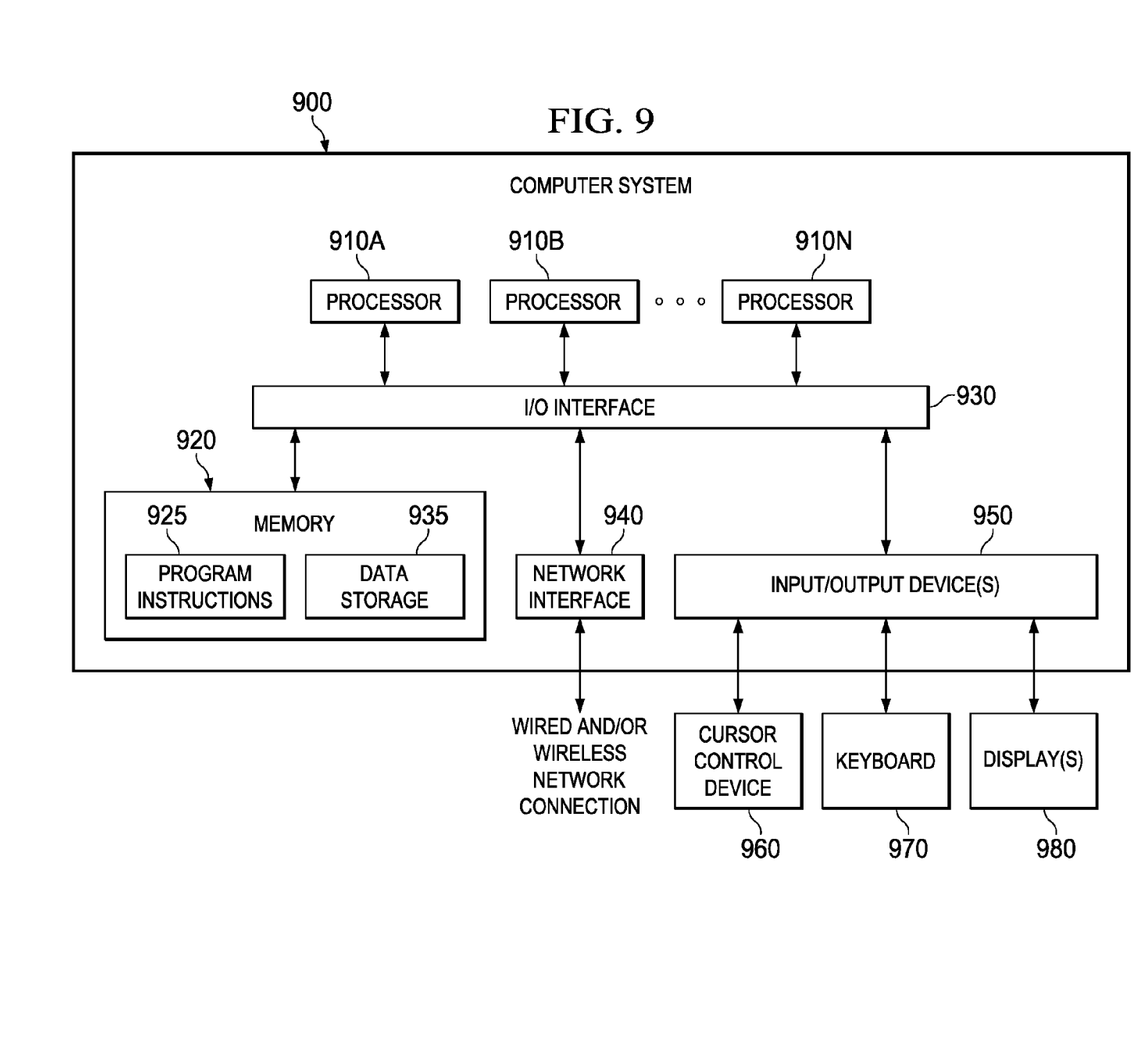
FIG. 9 is a block diagram of a computer system configured to implement various systems and methods described herein according to some embodiments.

Aspects of network monitoring system 103 may be implemented or executed by one or more computer systems. One such computer system is illustrated in FIG. 9. In various embodiments, computer system 900 may be a server, a mainframe computer system, a workstation, a network computer, a desktop computer, a laptop, or the like. For example, in some cases, front-end monitoring probe 205 shown in FIG. 2 may be implemented as computer system 900. Moreover, one or more of analyzer devices 210 and/or intelligence engine may include one or more computers in the form of computer system 900. As explained above, in different embodiments these various computer systems may be configured to communicate with each other in any suitable way, such as, for example, via network 100.

As illustrated, computer system 900 includes one or more processors 910A-N coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, a given entity (e.g., network monitoring system 110) may be implemented using a single instance of computer system 900, while in other embodiments multiple such systems, or multiple nodes making up computer system 900, may be configured to host different portions or instances of embodiments. For example, in an embodiment some elements may be implemented via one or more nodes of computer system 900 that are distinct from those nodes implementing other elements (e.g., a first computer system may implement classification engine 310 while another computer system may implement routing/distribution control module 330).

In various embodiments, computer system 900 may be a single-processor system including one processor 910A, or a multi-processor system including two or more processors 910A-N (e.g., two, four, eight, or another suitable number). Processor(s) 910A-N may be any processor capable of executing program instructions. For example, in various embodiments, processor(s) 910A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 910A-N may commonly, but not necessarily, implement the same ISA. Also, in some embodiments, at least one processor(s) 910A-N may be a graphics processing unit (GPU) or other dedicated graphics-rendering device.

System memory 920 may be configured to store program instructions and/or data accessible by processor(s) 910A-N. In various embodiments, system memory 920 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include any tangible, non-transitory storage media or memory media such as magnetic or optical media—e.g., disk or CD/DVD-ROM coupled to computer system 900 via I/O interface 930.

The terms "tangible" and "nontransitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor(s) 910A-N). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor(s) 910A-N.

Network interface 940 may be configured to allow data to be exchanged between computer system 900 and other devices attached to network 115, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touch screens, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement certain embodiments described herein, and data storage 935, comprising various data accessible by program instructions 925. In an embodiment, program instructions 925 may include software elements of embodiments illustrated in FIG. 2. For example, program instructions 925 may be implemented in various embodiments using any desired programming language, scripting language, or combination of programming languages and/or scripting languages (e.g., C, C++, C#, JAVA®, JAVASCRIPT®, PERL®, etc.). Data storage 935 may include data that may be used in these embodiments. In other embodiments, other or different software elements and data may be included.

A person of ordinary skill in the art will appreciate that computer system 900 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

This invention claimed:

1. A method, comprising:
performing, by a telecommunications monitoring system:
identifying a Security Association (SA) between a User Equipment (UE) and a Proxy Call Session Control Function (P-CSCF) of an Internet Protocol (IP) Multimedia Subsystem (IMS) over a Gm interface during a registration procedure wherein identifying the SA includes identifying a first SA pair and a second SA pair, wherein the first SA pair includes: (a) a UE client SPI value and UE IP address and (b) a UE server SPI value and UE IP address, and wherein the second SA pair includes (a) a P-CSCF client SPI value and P-CSCF IP address and (b) a P-CSCF server SPI value and P-CSCF IP address;
correlating the SA with a ciphering key (CK) exchanged between the P-CSCF and a Serving CSCF (S-CSCF) of the IMS over an Mw interface during the registration procedure; and
storing an indication of the correlated SA and CK in a deciphering record.

2. The method of claim 1, wherein the SA includes a security parameter index (SPI) and a destination IP address.

3. The method of claim 1, wherein correlating the SA with the CK includes matching a user identity from a message exchanged between the UE and the P-CSCF during the registration procedure against another message exchanged between the P-CSCF and the S-CSCF during the registration procedure.

4. The method of claim 3, wherein the user identity is an IP Multimedia Private Identity (IMPI) value.

5. The method of claim 1, further comprising storing, in the deciphering record, an indication of a security algorithm type to be used in subsequent communications between the UE and the IMS.

6. The method of claim 1, further comprising:
performing, by the telecommunications monitoring system:

after the registration procedure, receiving a ciphered packet exchanged
between the UE and the P-CSCF over the Gm interface;
ascertaining an SA associated with the ciphered packet;
identifying a CK corresponding to the ascertained SA in the deciphering record; and
deciphering the ciphered packet, at least in part, using the identified CK.

7. The method of claim 6, wherein ascertaining the SA includes ascertaining at least one of: (a) a UE client SPI value and UE IP address, (b) a UE server SPI value and UE IP address, (c) a P-CSCF client SPI value and P-CSCF IP address, and (d) a P-CSCF server SPI value and P-CSCF IP address.

8. The method of claim 6, wherein the ciphered packet follows an Encapsulating Security Payload (ESP) protocol.

9. The method of claim 8, wherein the ciphered packet is transmitted in Transport Mode.

10. A telecommunications monitoring system, comprising:
a processor; and
a memory coupled to the processor, the memory configured to store program instructions executable by the processor to cause the telecommunications monitoring system to:
identify a Security Association (SA) between a User Equipment (UE) and a Proxy Call Session Control Function (P-CSCF) of an Internet Protocol (IP) Multimedia Subsystem (IMS) over a Gm interface during an authentication procedure;
correlate the SA with a ciphering key (CK) exchanged between the P-CSCF and a Serving CSCF (S-CSCF) of the IMS over an Mw interface during the authentication procedure wherein to correlate the SA with the CK, the program instructions are further executable by the processor to cause the telecommunications monitoring system to match a user identity from a message exchanged between the UE and the P-CSCF during the authentication procedure against another message exchanged between the P-CSCF and the S-CSCF during the authentication procedure;
store an indication of the correlated SA and CK in a deciphering record;
receive a ciphered packet exchanged between the UE and the P-CSCF after the authentication procedure, the ciphered packet following an Encapsulating Security Payload (ESP) protocol in Transport Mode;
ascertain an SA associated with the ciphered packet;
identify a CK corresponding to the ascertained SA in the deciphering record;
and decipher the ciphered packet, at least in part, using the identified CK.

11. The telecommunications monitoring system of claim 10, wherein the SA includes a security parameter index (SPI) and a destination IP address.

12. The telecommunications monitoring system of claim 11, wherein the SA includes a first SA pair and a second SA pair, wherein the first SA pair includes: (a) a UE client SPI value and UE IP address and (b) a UE server SPI value and UE IP address, and wherein the second SA pair includes (a) a P-CSCF client SPI value and P-CSCF IP address and (b) a P-CSCF server SPI value and P-CSCF IP address.

13. The telecommunications monitoring system of claim 10, wherein the user identity is an IP Multimedia Private Identity (IMPI) value.

14. A tangible computer-readable storage medium having program instructions stored thereon that, upon execution by a processor within a computer system, cause the computer system to:
identify a Security Association (SA) between a User Equipment (UE) and a Proxy Call Session Control Function (P-CSCF) of an Internet Protocol (IP) Multimedia Subsystem (IMS) over a Gm interface during an authentication procedure;
correlate the SA with a ciphering key (CK) exchanged between the P-CSCF and a Serving CSCF (S-CSCF) of the IMS over an Mw interface during the authentication procedure wherein to correlate the SA with the CK, the program instructions are further executable by the processor to cause the computer system to match a user identity from a message exchanged between the UE and the P-CSCF during the authentication procedure against another message exchanged between the P-CSCF and the S-CSCF during the authentication procedure;
store an indication of the correlated SA and CK in a deciphering record;
receive a ciphered packet exchanged between the UE and the P-CSCF after the authentication procedure, the ciphered packet following an Encapsulating Security Payload (ESP) protocol in Transport Mode;
ascertain an SA associated with the ciphered packet;
identify a CK corresponding to the ascertained SA in the deciphering record; and
decipher the ciphered packet, at least in part, using the identified CK.

15. The tangible computer-readable storage medium of claim 14, wherein the SA includes a security parameter index (SPI) and a destination IP address.

16. The tangible computer-readable storage medium of claim 14, wherein the SA includes a first SA pair and a second SA pair, wherein the first SA pair includes: (a) a UE client SPI value and UE IP address and (b) a UE server SPI value and UE IP address, and wherein the second SA pair includes (a) a P-CSCF client SPI value and P-CSCF IP address and (b) a P-CSCF server SPI value and P-CSCF IP address.

17. The tangible computer-readable storage medium of claim 14, wherein the user identity is an IP Multimedia Private Identity (IMPI) value.

* * * * *